US012636603B2

(12) United States Patent (10) Patent No.: US 12,636,603 B2
Kurimoto et al. (45) Date of Patent: May 26, 2026

(54) HONEYCOMB FILTER

(71) Applicant: NGK Insulators, Ltd., Nagoya (JP)

(72) Inventors: Yudai Kurimoto, Shanghai (CN);
Fumihiko Yoshioka, Novi, MI (US)

(73) Assignee: NGK INSULATORS, LTD., Nagoya
(JP)

( * ) Notice: Subject to any disclaimer, the term of this
patent is extended or adjusted under 35
U.S.C. 154(b) by 393 days.

(21) Appl. No.: 18/068,741

(22) Filed: Dec. 20, 2022

(65) Prior Publication Data

US 2023/0356131 A1 Nov. 9, 2023

(30) Foreign Application Priority Data

Mar. 30, 2022 (JP) ................................. 2022-057085

(51) Int. Cl.
B01D 46/24 (2006.01)
C04B 38/00 (2006.01)

(52) U.S. Cl.
CPC ... B01D 46/2429 (2013.01); B01D 46/24491
(2021.08); B01D 46/24492 (2021.08);
(Continued)

(58) Field of Classification Search
None
See application file for complete search history.

(56) References Cited

U.S. PATENT DOCUMENTS

2010/0126132 A1* 5/2010 Merkel ............ B01D 46/24493
55/523
2012/0148792 A1* 6/2012 Okazaki ................ C04B 38/067
428/116
(Continued)

FOREIGN PATENT DOCUMENTS

JP 2004360654 A * 12/2004
JP 2019-171318 A 10/2019
(Continued)

OTHER PUBLICATIONS

Suwabe et al., machine translation of JP 2004-360654, Dec. 24, 2004 (Year: 2004).*
(Continued)

*Primary Examiner* — Mary I Omori
(74) *Attorney, Agent, or Firm* — BURR PATENT LAW,
PLLC

(57) ABSTRACT

A honeycomb filter comprising a pillar-shaped honeycomb structure body having a porous partition wall and a plugging portion, wherein a thickness of the partition wall is 0.257 mm or less, a porosity of the partition wall is 52 to 57%, an average pore diameter of the partition wall is 6 to 13 $\mu$m, a number per unit area of pores which exist at a surface of the partition wall and which have equivalent circle opening diameters exceeding 3 $\mu$m is 800 to 1500/mm$^2$, an average equivalent circle opening diameter of pores which exist at a surface of the partition wall and which have equivalent circle opening diameters exceeding 3 $\mu$m is 8.0 to 12.0 $\mu$m, and in a pore diameter distribution of the partition wall,
D10 is 2.0 to 5.5 $\mu$m,
D90 is 13.0 to 25.5 $\mu$m, and
(Log(D90)−Log(D10))/Log(D50) is 0.84 or less.

4 Claims, 3 Drawing Sheets

(52) U.S. Cl.
CPC ..... *B01D 46/2474* (2013.01); *B01D 46/2482*
(2021.08); *B01D 46/2484* (2021.08); *B01D*
*46/249* (2021.08); *B01D 46/2498* (2021.08);
*C04B 38/0009* (2013.01); *C04B 38/0012*
(2013.01); *B01D 2279/30* (2013.01)

(56) References Cited

U.S. PATENT DOCUMENTS

| | | | | |
|---|---|---|---|---|
| 2012/0317947 | A1* | 12/2012 | Okazaki | ............. B01D 46/2484 |
| | | | | 264/43 |
| 2014/0103560 | A1* | 4/2014 | Okazaki | ........... B01D 46/24491 |
| | | | | 264/43 |
| 2017/0298794 | A1 | 10/2017 | Okazaki | |
| 2018/0264453 | A1* | 9/2018 | Kuki | ..................... C04B 35/478 |
| 2019/0299147 | A1 | 10/2019 | Yoshioka | |
| 2021/0268422 | A1* | 9/2021 | Sendo | ............. B01D 46/24491 |
| 2021/0270161 | A1 | 9/2021 | Sendo et al. | |
| 2021/0270162 | A1* | 9/2021 | Sendo | ..................... B01J 35/56 |
| 2023/0311048 | A1 | 10/2023 | Kurimoto et al. | |

FOREIGN PATENT DOCUMENTS

| | | | |
|---|---|---|---|
| JP | 2021-137684 A | 9/2021 | |
| JP | 2023-148835 A | 10/2023 | |
| WO | 2016/152709 A1 | 9/2016 | |
| WO | WO-2017051806 A1 * | 3/2017 | ............. C04B 38/00 |

OTHER PUBLICATIONS

Horie et al., machine translation of WO 2017/051806, Mar. 30, 2017
(Year: 2017).*
Japanese Office Action (with English translation), Application No.
2022-057085 A, dated Aug. 5, 2025 (13 pages).

* cited by examiner

FIG. 2                                    100
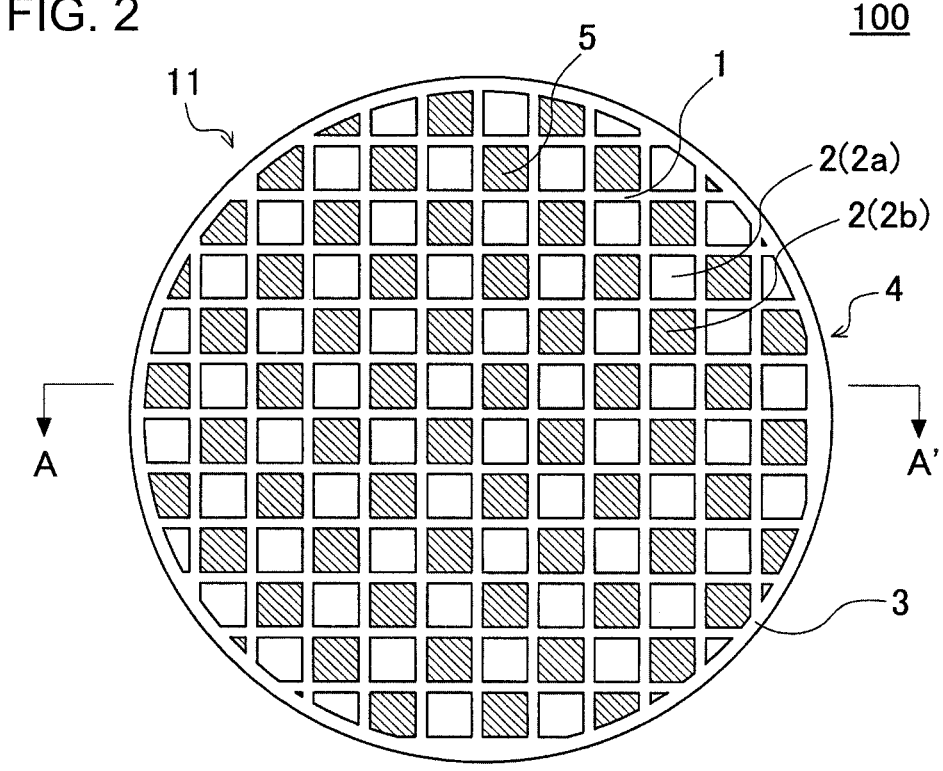

FIG. 3 <u>100</u>
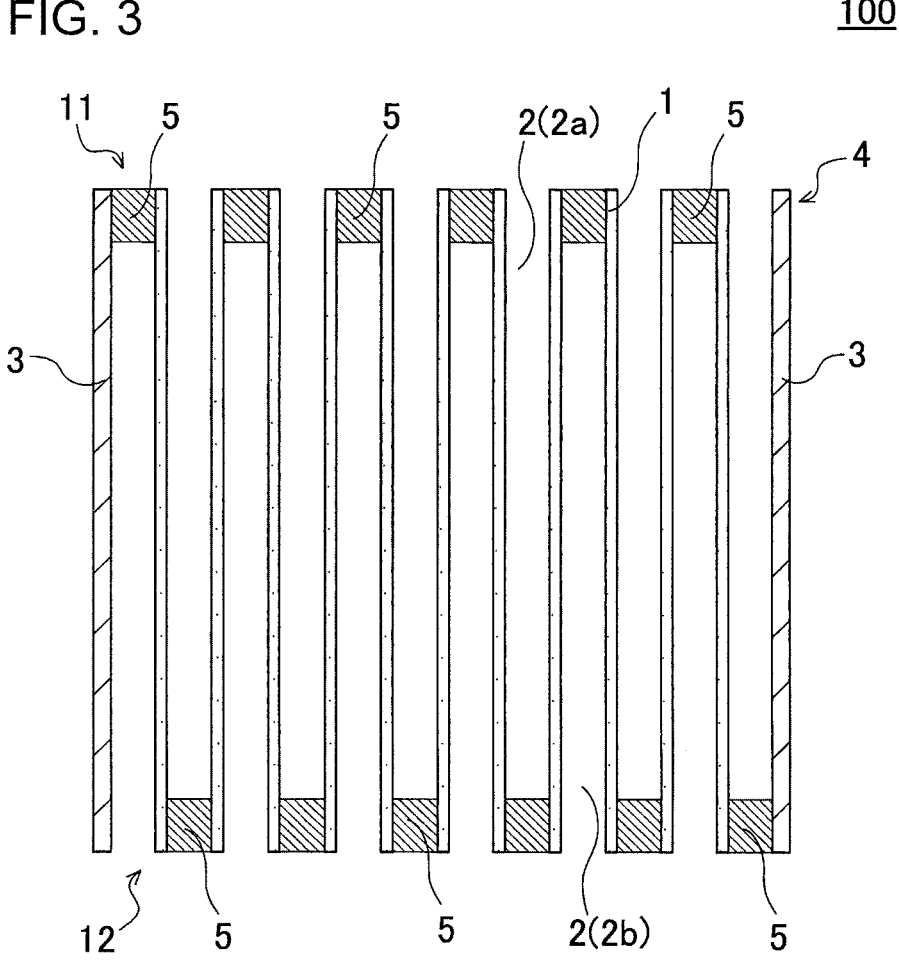

HONEYCOMB FILTER

RELATED APPLICATIONS

The present application is an application based on JP 2022-057085 filed on Mar. 30, 2022 with Japan Patent Office, the entire contents of which are incorporated herein by reference.

BACKGROUND OF THE INVENTION

Field of the Invention

The present invention relates to a honeycomb filter. More specifically, the present invention relates to a honeycomb filter having excellent trapping performance and capable of suppressing an increase in pressure loss.

Description of the Related Art

Conventionally, a honeycomb filter using a honeycomb structure has been known as a filter for trapping particulate matter in exhaust gas emitted from an internal combustion engine such as an automobile engine, or a device for purifying toxic gas components such as CO, HC, NOx (see Patent Document 1). The honeycomb structure includes a partition wall made of porous ceramics such as cordierite and a plurality of cells defined by the partition wall. A honeycomb filter includes such a honeycomb structure provided with plugging portions so as to plug the open ends on the inflow end face side and the outflow end face side of the plurality of cells alternately. In other words, the honeycomb filter has a structure in which inflow cells having the inflow end face side open and the outflow end face side plugged and outflow cells having the inflow end face side plugged and the outflow end face side open are arranged alternately with the partition wall therebetween. In the honeycomb filter, the porous partition wall serves as a filter for trapping the particulate matter in exhaust gas. Hereinafter, the particulate matter contained in exhaust gas may be referred to as "PM". The "PM" is an abbreviation for "Particulate Matter."

At present, exhaust gas regulations for large diesel vehicles are becoming stricter year by year, and in particular, the emission standards for PM such as soot in exhaust gas emitted (PN regulations: regulation of the number of Particle matter) are becoming stricter. For this reason, diesel vehicles are required to be equipped with an exhaust gas purifying filter, for example, a Diesel Particulate Filter (DPF).

[Patent Document 1] JP-A-2019-171318

In order to improve trapping performance of a honeycomb filter such as a DPF, it is conceivable to reduce an average pore diameter of a partition wall as a filter, but as a contradictory property, pressure loss tends to increase. On the other hand, since the fuel efficiency regulations of diesel vehicles and the like are stricter year by year, the increase in pressure loss of the honeycomb filter is not preferable from the viewpoint of fuel efficiency.

The present invention has been achieved in view of the problems with the prior arts described above. According to the present invention, there is provided a honeycomb filter having excellent trapping performance and capable of effectively suppressing an increase in pressure loss. In particular, according to the present invention, there is provide a honeycomb filter that is excellent in trapping performance and can suppress an increase in pressure loss while satisfactorily dealing with thinning and high porosity of a partition wall.

SUMMARY OF THE INVENTION

According to the present invention, there is provided a honeycomb filter to be described below.

[1] A honeycomb filter including: a pillar-shaped honeycomb structure body having a porous partition wall disposed to surround a plurality of cells which serve as fluid through channels extending from a first end face to a second end face; and a plugging portion provided at an open end on the first end face side or the second end face side of each of the cells, wherein a thickness of the partition wall is 0.257 mm or less, a porosity of the partition wall is 52 to 57%, an average pore diameter of the partition wall is 6 to 13 μm, a number per unit area of pores which exist at a surface of the partition wall and which have equivalent circle opening diameters exceeding 3 μm is 800 to 1500/mm$^2$, an average equivalent circle opening diameter of pores which exist at a surface of the partition wall and which have equivalent circle opening diameters exceeding 3 μm is 8.0 to 12.0 μm, and in a pore diameter distribution of the partition wall, in the case where the pore diameter (μm) whose cumulative pore volume is 10% of the total pore volume is denoted by D10, the pore diameter (μm) whose cumulative pore volume is 50% of the total pore volume is denoted by D50, and the pore diameter (μm) whose cumulative pore volume is 90% of the total pore volume is denoted by D90, D10 is 2.0 to 5.5 μm, D90 is 13.0 to 25.5 μm, and (Log(D90)−Log(D10))/Log(D50) is 0.84 or less.

[2] The honeycomb filter according to [1], wherein the thickness of the partition wall is 0.252 mm or less, the porosity of the partition wall is 52.6 to 56.2%, the average pore diameter of the partition wall is 7 to 12 μm, the number per unit area of pores which exist at a surface of the partition wall and which have equivalent circle opening diameters exceeding 3 μm is 850 to 1260/mm$^2$, the average equivalent circle opening diameter of pores which exist at a surface of the partition wall and which have equivalent circle opening diameters exceeding 3 μm is 8.8 to 11.2 μm, D10 is 2.8 to 5.0 μm, D90 is 16.5 to 24.0 μm, and (Log(D90)−Log(D10))/Log(D50) is 0.77 or less.

[3] The honeycomb filter according to [1] or [2], wherein a cell density of the honeycomb structure body is 43 to 56 cells/cm$^2$.

[4] The honeycomb filter according to any one of [1] to [3], wherein the partition wall is made of a material including cordierite as a main component.

The honeycomb filter according to the present invention has excellent trapping performance and can suppress an increase in pressure loss. In other words, the honeycomb filter of the present invention achieves excellent trapping performance by setting the thickness, the porosity, and the average pore diameter of the partition wall to the numerical ranges described above. In particular, by reducing the average pore diameter of the partition wall, extremely excellent trapping performance is achieved. On the other hand, by increasing the number of pores opening on the surface of the partition wall, the flow of exhaust gas through the partition wall is made uniform, and the increase in the pressure loss caused by reducing the average pore diameter of the partition wall is prevented or suppressed.

The honeycomb filter according to the present invention can realize excellent trapping performance and effectively suppress an increase in pressure loss while favorably corresponding to thinning and higher porosity of the partition wall, for example.

BRIEF DESCRIPTION OF THE DRAWINGS

FIG. 2 is a plan view of the honeycomb filter shown in FIG. 1 as viewed from the inflow end face side; and FIG. 3 is a sectional view schematically showing a section taken along the line A-A' of FIG. 2.

DESCRIPTION OF THE PREFERRED EMBODIMENTS

Figure 1:
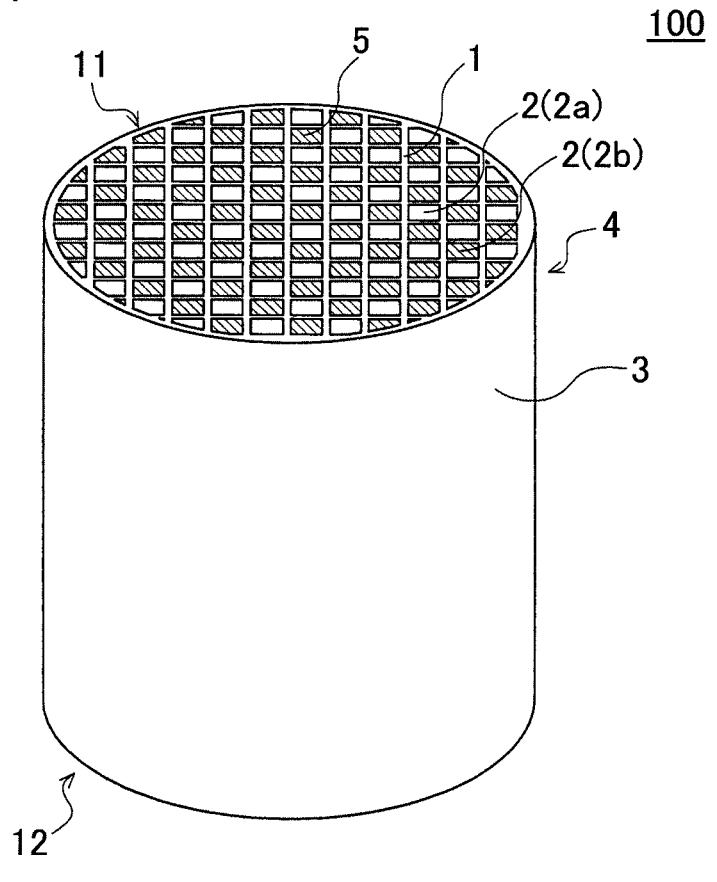
FIG. 1 is a perspective view schematically showing one embodiment of a honeycomb filter according to the present invention as viewed from an inflow end face side.

Hereinafter, embodiments of the present invention will be described, but the present invention is not limited to the following embodiments. Therefore, it should be understood that those in which modifications, improvements, and the like have been appropriately added to the following embodiments are within the scope of the present invention based on the ordinary knowledge of those skilled in the art without departing from the spirit of the present invention.

(1) Honeycomb Filter

As shown in FIG. 1 to FIG. 3, a first embodiment of a honeycomb filter according to the present invention is the honeycomb filter 100 that includes a honeycomb structure body 4 and plugging portions 5. The honeycomb structure body 4 is a pillar-shaped structure including a porous partition wall 1 disposed so as to surround a plurality of cells 2 serve as fluid through channels extending from a first end face 11 to a second end face 12. In the honeycomb filter 100, the honeycomb structure body 4 is pillar-shaped and further includes a circumferential wall 3 on its circumferential side face. In other words, the circumferential wall 3 is disposed to encompass the partition wall 1 disposed in a grid pattern.

FIG. 1 is a perspective view schematically showing one embodiment of the honeycomb filter according to the present invention as viewed from an inflow end face side. FIG. 2 is a plan view of the honeycomb filter shown in FIG. 1 as viewed from the inflow end face side. FIG. 3 is a sectional view schematically showing a section taken along the line A-A' of FIG. 2.

In the honeycomb filter 100, the partition wall 1 constituting the honeycomb structure body 4 is configured as described below.

The honeycomb filter 100 has a porosity of the partition wall 1 of 52 to 57%. The porosity of the partition wall 1 is a value measured by a mercury press-in method. The porosity of the partition wall 1 can be measured by using AUTOPORE 9500 (product name) manufactured by Micromeritics, for example. To measure the porosity, a part of the partition wall 1 may be cut out from the honeycomb filter 100 to prepare a test piece for the measurement. The porosity of the partition wall 1 is preferably 52.6 to 56.2%, and is further preferably 53.0 to 55.0%.

By setting the porosity of the partition wall 1 to 52 to 57%, pressure loss can be reduced. When the porosity of the partition wall 1 is less than 52%, pressure loss of the honeycomb filter 100 is not sufficiently reduced. On the other hand, when the porosity of the partition wall 1 exceeds 57%, the mechanical strength of the honeycomb filter 100 decreases.

The honeycomb filter 100 has an average pore diameter of the partition wall 1 of 6 to 13 μm. The average pore diameter of the partition wall 1 is a value measured by a mercury press-in method. The average pore diameter of the partition wall 1 can be measured by using AUTOPORE 9500 (product name) manufactured by Micromeritics, for example. The average pore diameter can be measured using the test piece described above for measuring the porosity. The average pore diameter of the partition wall 1 is preferably 7 to 12 μm. The average pore diameter of the partition wall 1 is calculated as pore diameter, which gives half the volume of total pore volume by the mercury press-in method. The average pore diameter of the partition wall 1 corresponds to the value of "D50 (μm)" in the pore diameter distribution of the partition wall 1 described below.

By setting the average pore diameter of the partition wall 1 to 6 to 13 μm, it is possible to improve trapping performance while reducing pressure loss. When the average pore diameter of the partition wall 1 is less than 6 μm, the transmission resistivity increases, which is not preferable in terms of increasing pressure loss. On the other hand, when the average pore diameter of the partition wall 1 exceeds 13 μm, filtration efficiency of the honeycomb filter 100 cannot be sufficiently improved.

In addition, in the partition wall 1 constituting the honeycomb structure body 4, a number per unit area (1 mm$^2$) of pores which exist at a surface of the partition wall and which have equivalent circle opening diameters exceeding 3 μm is 800 to 1500/mm$^2$. Hereinafter, the number per unit area of the pores (/mm$^2$) which exist at a surface of the partition wall 1 may be simply referred to as the "the number of pores (/mm$^2$) on the surface of the partition wall 1". When the number of pores on the surface of the partition wall 1 is less than 800/mm$^2$, it is not sufficiently effective to suppress an increase in pressure loss. When the number of pores on the surface of the partition wall 1 exceeds 1500/mm$^2$, the mechanical strength of the honeycomb filter 100 decreases.

The number of pores (/mm$^2$) on the surface of the partition wall 1 is not particularly limited, but is preferably 850 to 1260/mm$^2$, and more preferably 980 to 1250/mm$^2$. With this configuration, the above-described effects can be further improved.

In the partition wall 1 constituting the honeycomb structure body 4, an average equivalent circle opening diameter of pores which exist at a surface of the partition wall 1 and which have equivalent circle opening diameters exceeding 3 μm is 8.0 to 12.0 μm. Hereinafter, the average equivalent circle opening diameter (μm) of the pores which exist at a surface of the partition wall 1 may be simply referred to as "the average equivalent circle opening diameter (μm) of pores on the surface of the partition wall 1" or "the average opening diameter (μm) of pores on the surface of the partition wall 1". When the average opening diameter of pores on the surface of the partition wall 1 is less than 8.0 μm, it is not preferable in terms of lowering isostatic strength. When the average opening diameter of pores on the surface of the partition wall 1 exceeds 12.0 μm, filtration efficiency of the honeycomb filter 100 cannot be sufficiently improved.

The average opening diameter (μm) on the surface of the partition wall 1 is not particularly limited, but is preferably 8.8 to 11.2 μm, and more preferably 9.2 to 10.2 μm. With such a configuration, the above-described effects can be further improved.

The number of pores (/mm$^2$) on the surface of the partition wall 1 and the average opening diameter (μm) of pores can be measured by the following methods. First, a sample for measurement is cut out from the honeycomb structure body 4 so as to observe the surface of the partition wall 1 of the honeycomb structure body 4. Then, the surface of the partition wall 1 of the sample for measurement is photographed by a laser microscope. The laser microscope that can be used is, for example, a shape analysis laser microscope of "VK X250/260 (product name)" manufactured by KEYENCE Corporation. In photographing the surface of the partition wall 1, the magnification is set to 480 times, and arbitrary places of 10 fields of view are photographed. The image processing is performed to the captured images to calculate the number of pores (/mm²) on the surface of the partition wall 1 and the average opening diameter (μm) of pores. In the image processing, an area is selected such that no portion of the partition wall 1 except the surface of the partition wall 1 is included in the area to be subjected to the image processing, and the inclination of the surface of the partition wall 1 is corrected to be horizontal. Thereafter, the upper limit of the height for being recognized as pores is changed to –3.0 μm from a reference surface. The number of pores and the equivalent circle opening diameter (μm) of each pore of the captured images are calculated by the image processing software under the condition that pores having the equivalent circle opening diameters of 3 μm or less are ignored. The equivalent circle opening diameter (μm) of pores on the surface of the partition wall 1 can be calculated by measuring an opening area S of each pore and applying an equation of the equivalent circle opening diameter=$\sqrt{\{4\times(\text{area S})/\pi\}}$ with respect to the opening area S that has been measured. The value of the number of pores (/mm²) on the surface of the partition wall 1 is an average value of the measured values of 10 fields of view (that is, the number of pores (/mm²) of the respective captured images of 10 fields of view). The value of the average opening diameter (μm) of pores on the surface of the partition wall 1 is an average value of the measured values of the 10 fields of view (that is, the average opening diameter (μm) of the respective captured images of the 10 fields of view). The image processing software that can be used is, for example, "VK-X (product name)" included with the shape analysis laser microscope of "VK X250/260 (product name)" manufactured by KEYENCE Corporation. The measurement of the equivalent circle opening diameter of each pore and the image analysis ignoring pores that have predetermined equivalent circle opening diameters can be performed using the image processing software described above.

Further, in the honeycomb filter 100, it is preferable that a pore diameter distribution, in which a cumulative pore volume of the partition wall 1 measured by the mercury press-in method is indicated by a pore diameter (μm) on a horizontal axis and a log differential pore volume (cm³/g) on a vertical axis, is configured as follows. In the above-described pore diameter distribution of the partition wall 1, the pore diameter (μm) whose cumulative pore volume is 10% of the total pore volume is denoted by D10. Similarly, the pore diameter (μm) whose cumulative pore volume is 50% of the total pore volume is denoted by D50, and the pore diameter (μm) whose cumulative pore volume is 90% of the total pore volume is denoted by D90. In the pore diameter distribution of the partition wall 1, the honeycomb filter 100 has D10 of 2.0 to 5.5 μm, D90 of 13.0 to 25.5 μm, and (Log(D90)–Log(D10))/Log(D50) of 0.84 or less.

When D10 is 2.0 to 5.5 μm, it is superior in terms of suppressing pressure loss. For example, when D10 is less than 2.0 μm, it is not preferable in terms of increasing pressure loss. Conversely, when D10 exceeds 5.5 μm, it is not preferable in terms of trapping performance degradation. D10 is preferably 2.8 to 5.0 μm.

In addition, when D90 is 13.0 to 25.5 μm, it is superior in terms of improving trapping performance. For example, when D90 is less than 13.0 μm, it is not preferable in terms of increasing pressure loss. Conversely, when D90 is more than 25.5 μm, it is not preferable in terms of trapping performance degradation. D90 is preferably 16.5 to 24.0 μm.

When (Log(D90)–Log(D10))/Log(D50) is 0.84 or less, it is superior in terms of suppressing pressure loss. (Log (D90)–Log(D10))/Log(D50) is preferably 0.77 or less. The lower limit value of (Log(D90)–Log(D10))/Log(D50) is not particularly limited, but the substantial lower limit value is 0.55.

The cumulative pore volume of the partition wall 1 is a value measured by the mercury press-in method. The cumulative pore volume of the partition wall 1 can be measured using, for example, AUTOPORE 9500 (product name) manufactured by Micromeritics. The measurement of the cumulative pore volume of the partition wall 1 can be performed by the following method. First, a part of the partition wall 1 is cut out from the honeycomb filter 100 to make a test piece for measuring the cumulative pore volume. The size of the test piece is not particularly limited, but the test piece is preferably, for example, a rectangular parallelepiped having a length, a width, and a height of approximately 10 mm, approximately 10 mm, and approximately 20 mm, respectively. A portion of the partition wall 1 from which the test piece is cut out is not particularly limited, but the test piece is preferably made by cutting from the vicinity of the center of the honeycomb structure body in the axial direction. The obtained test piece is placed in a measurement cell of a measurement device, and the interior of the measurement cell is depressurized. Next, mercury is introduced into the measurement cell. Next, the mercury that has been introduced into the measurement cell is pressurized, and the volume of the mercury pushed into the pores existing in the test piece is measured during the pressurization. At this time, as the pressure applied to the mercury is increased, the mercury is pushed into the pores progressively from pores having larger pore diameters and then to pores having smaller pore diameters. Therefore, the relationship between "the pore diameters of the pores formed in the test piece" and "the cumulative pore volume" can be determined from the relationship between "the pressure to be added to the mercury" and "the volume of the mercury pushed into the pores." More specifically, as described above, by the mercury press-in method, when a pressure is gradually applied to the mercury to intrude into the pores of the sample (test piece) in a container sealed in a vacuum state, the pressurized mercury intrudes into the larger pores and then into the smaller pores of the sample. Based on the pressure and the amount of mercury intruded at that time, the pore diameters of the pores formed in the sample and the volumes of the pores can be calculated. Hereinafter, when the pore diameters are denoted by D1, D2, D3 . . . , the relationship of D1>D2>D3 . . . is to be satisfied. In this case, an average pore diameter D between measurement points (e.g., from D1 to D2) can be indicated on the horizontal axis by "the average pore diameter D=(D1+D2)/2." The Log differential pore volume on the vertical axis can be indicated by a value obtained by dividing an increment dV of the pore volume between measurement points by a difference value treated as the logarithms of the pore diameters (i.e., "log(D1)–log (D2))."

The thickness of the partition wall 1 is 0.257 mm or less. The thickness of the partition wall 1 can be measured by using a scanning electron microscope or a microscope, for example. If the thickness of the partition wall 1 exceeds 0.257 mm, an increase in pressure loss is not sufficiently suppressed. The thickness of the partition wall 1 is preferably 0.252 mm or less. The lower limit of the thickness of the partition wall 1 is not particularly limited, but, for example, if the thickness of the partition wall 1 is extremely thin, the trapping performance and the mechanical strength may be affected. For this reason, although not particularly limited, the lower limit of the thickness of the partition wall 1 may be 0.152 mm.

The honeycomb filter 100 according to the present embodiment has excellent trapping performance and can suppress an increase in pressure loss. For example, the honeycomb filter 100 according to the present embodiment achieves excellent trapping performance by setting the thickness, the porosity, and the average pore diameter of the partition wall 1 to the numerical ranges described above. In particular, by reducing the average pore diameter of the partition wall 1, extremely excellent trapping performance is achieved. On the other hand, by increasing the number of opening pores on the surface of the partition wall 1, the flow of exhaust gas through the partition wall 1 is made uniform, and the increase in pressure loss caused by reducing the average pore diameter of the partition walls 1 is prevented or suppressed. The honeycomb filter 100 according to the present embodiment can realize excellent trapping performance and effectively suppress an increase in pressure loss while favorably corresponding to thinning and higher porosity of the partition wall, for example.

The material of the partition wall 1 is not particularly limited, and any porous material may be used as long as the pore diameter distribution of the partition wall 1, the number of pores (/mm$^2$) on the surface of the partition wall 1 and the average opening diameter ($\mu$m) of pores satisfy the configuration described above. For example, the material of the partition wall 1 preferably includes at least one kind selected from a group consisting of cordierite, silicon carbide, silicon-silicon carbide composite material, cordierite-silicon carbide composite material, silicon nitride, mullite, alumina, and aluminum titanate. The material constituting the partition wall 1 is preferably a material including 90% by mass or more of the materials listed in the above group, is further preferably a material including 92% by mass or more of the materials listed in the above group, and is particularly preferably a material including 95% by mass or more of the materials listed in the above group. The silicon-silicon carbide composite material is a composite material formed using silicon carbide as aggregates and silicon as bonding materials. The cordierite-silicon carbide composite material is a composite material formed using silicon carbide as aggregates and cordierite as bonding materials. In the honeycomb filter 100 according to the present embodiment, the material constituting the partition wall 1 is particularly preferably a material containing cordierite as a main component.

The shape of the cells 2 formed in the honeycomb structure body 4 is not particularly limited. For example, the shape of the cells 2 in a section that is orthogonal to the extending direction of the cells 2 may include a polygonal shape, a circular shape, an elliptical shape, and the like. The polygonal shape can include a triangle, a quadrangle, a pentagon, a hexagon, an octagon, and the like. The shape of the cells 2 is preferably a triangle, a quadrangle, a pentagon, a hexagon or an octagon. Moreover, regarding the shapes of the cells 2, all the cells 2 may have the same shape or different shapes. For example, although not shown, quadrangular cells and octagonal cells may be mixed. Further, regarding the sizes of the cells 2, all the cells 2 may have the same size or different sizes. For example, although not shown, among the plurality of cells, some cells may be made to be large, and other cells may be made to be relatively smaller. In the present invention, the cells 2 mean the spaces surrounded by the partition wall 1.

The cell density of the cells 2 defined by the partition wall 1 is preferably 43 to 56 cells/cm$^2$, more preferably 48 to 51 cells/cm$^2$. With this configuration, the honeycomb filter 100 can be preferably used as a filter for purifying exhaust gas emitted from an automobile engine.

The circumferential wall 3 of the honeycomb structure body 4 may be configured integrally with the partition wall 1 or may be composed of a circumferential coat layer formed by applying a circumferential coating material to the circumferential side of the partition wall 1. For example, although not shown, the circumferential coat layer can be provided on the circumferential side of the partition wall after the partition wall and the circumferential wall are integrally formed and then the formed circumferential wall is removed by a well-known method, such as grinding, in a manufacturing process.

The shape of the honeycomb structure body 4 is not particularly limited. The shape of the honeycomb structure body 4 can be a pillar-shape in which the shape of the first end face 11 (for example, the inflow end face) and the second end face 12 (for example, the outflow end face) includes a circular shape, an elliptical shape, a polygonal shape or the like.

The size of the honeycomb structure body 4, for example, the length from the first end face 11 to the second end face 12, and the size of a section orthogonal to the extending direction of the cells 2 of the honeycomb structure body 4, is not particularly limited. Each size may be selected as appropriate such that optimum purification performance is obtained when the honeycomb filter 100 is used as a filter for purifying exhaust gas.

In the honeycomb filter 100, the plugging portions 5 are disposed at the open ends on the first end face 11 side of predetermined cells 2 and at the open ends on the second end face 12 side of the remaining cells 2. If the first end face 11 is defined as the inflow end face, and the second end face 12 is defined as the outflow end face, then the cells 2 which have the plugging portions 5 disposed at the open ends on the outflow end face side and which have the inflow end face side open are defined as inflow cells 2a. Moreover, the cells 2 which have the plugging portions 5 disposed at the open ends on the inflow end face side and which have the outflow end face side open are defined as outflow cells 2b. The inflow cells 2a and the outflow cells 2b are preferably arranged alternately with the partition wall 1 therebetween. Thereby, a checkerboard pattern is preferably formed by the plugging portions 5 and "the open ends of the cells 2" on both end faces of the honeycomb filter 100.

The material of the plugging portions 5 is preferably a material that is preferred as the material of the partition wall 1. The material of the plugging portions 5 and the material of the partition wall 1 may be the same or different.

In the honeycomb filter 100, the partition wall 1 defining the plurality of cells 2 is preferably loaded with a catalyst for purifying exhaust gas. Loading the partition wall 1 with a catalyst refers to coating catalyst onto the surface of the partition wall 1 and the inner walls of the pores formed in the partition wall 1.

(2) Manufacturing Method of Honeycomb Filter

There is no particular limitation on the manufacturing method of the honeycomb filter according to the present embodiment shown in FIGS. 1 to 3, and the honeycomb filter can be manufactured by the following method, for example. First, a plastic kneaded material is prepared to make a honeycomb structure body. The kneaded material for making honeycomb structure body can be prepared, for example, as follows. Talc, kaolin, alumina, aluminum hydroxide, silica, and the like are used as raw material powders, and these raw material powders can be prepared to obtain a chemical composition that contains silica in the range of 42 to 56% by mass, alumina in the range of 30 to 45% by mass, and magnesia in the range of 12 to 16% by mass.

In the honeycomb filter according to the present embodiment, in the pore diameter distribution of the partition wall, the values of D10 and D90 are within predetermined numerical ranges, and (Log(D90)−Log(D10))/Log(D50) is 0.84 or less. In addition, the number of pores (/mm$^2$) on the surface of the partition wall and the average opening diameter (μm) of pores are also within certain numerical ranges. Examples of the method of manufacturing such a honeycomb filter include a method of using a raw material including at least one of fused silica and porous silica as a raw material of the kneaded material, and adjusting the distribution of fused silica and porous silica included in such a raw material.

Next, the kneaded material thus obtained is subjected to extrusion so as to make a honeycomb formed body having a partition wall defining a plurality of cells, and an outer wall disposed to encompass the partition wall.

The obtained honeycomb formed body is dried by, for example, microwave and hot air, and the open ends of the cells are plugged using the same material as the material used for making honeycomb formed body, thereby making plugging portions. The honeycomb formed body may be further dried after making the plugging portions.

Next, a honeycomb filter is manufactured by firing the honeycomb formed body in which the plugging portions were made. A firing temperature and a firing atmosphere are different depending on the raw material, and those skilled in the art can select the firing temperature and the firing atmosphere that are the most suitable for the selected material.

EXAMPLES

The following describes the present invention more specifically by examples, but the present invention is not limited to these examples.

Example 1

A kneaded material was prepared by adding a pore former of 0.5 parts by mass, a dispersing medium of 1.0 parts by mass, and an organic binder of 6 parts by mass to a cordierite forming raw material of 100 parts by mass and mixing and kneading them. Methylcellulose was used as the organic binder. A potassium laurate soap was used as a dispersing agent. Water-absorbing polymer having the average particle diameter of 20 μm was used as the pore former. Talcum, kaolin, alumina, aluminum hydroxide, and porous silica were used as the cordierite forming raw material.

Next, the obtained kneaded material was molded using an extruder to make a honeycomb formed body. Next, the obtained honeycomb formed body was dried by high frequency dielectric heating, and then further dried using a hot air dryer. The shape of the cells in the honeycomb formed body was quadrangular.

Next, the plugging portions were formed in the dried honeycomb formed body. First, the inflow end face of the honeycomb formed body was masked. Next, the end portion provided with the mask (the end portion on the inflow end face side) was immersed in the plugging slurry, and the open ends of the cells without the mask (the outflow cells) were filled up with the plugging slurry. In this way, the plugging portions were formed on the inflow end face side of the honeycomb formed body. Then, the plugging portions were also formed in the inflow cells in the same manner for the outflow end face of the dried honeycomb formed body.

Next, the honeycomb formed body in which the plugging portions have been formed was dried with a microwave dryer, and further dried completely with a hot air dryer, and then both end faces of the honeycomb formed body were cut and adjusted to a predetermined size. The dried honeycomb formed body was then degreased and fired to manufacture the honeycomb filter of Example 1.

The honeycomb filter of Example 1 had the diameter of the end faces of 228.6 mm and the length in the extending direction of the cells of 184.2 mm. Further, the thickness of the partition wall was 0.241 mm and the cell density was 51 cells/cm$^2$. The thickness of the partition wall and the cell density are shown in Table 1.

On the honeycomb filter of Example 1, the porosity of the partition wall was measured in the following method. The cumulative pore volume of the partition wall was also measured, and based on the measurement result, a pore diameter distribution indicating the pore diameter (μm) on the horizontal axis and the log differential pore volume (cm$^3$/g) on the vertical axis was created, and D10 (μm), D50 (μm), and D90 (μm) of the created pore diameter distribution were determined. Table 1 shows the result. D50 (μm) is the average pore diameter (μm) of the partition wall. The values of (Log(D90)−Log(D10))/Log(D50) were calculated from the values of D10 (μm), D50 (μm), and D90 (μm). The calculated values are shown in the column of "Equation (1)" in Table 1. In Tables 1, Equation (1) represents (Log(D90)−Log(D10))/Log(D50). In addition, D50 (μm) represents the average pore diameter (μm) of the partition wall.

| | Partition wall thickness (mm) | Cell density (cells/cm$^2$) | Porosity (%) | D50 (Average pore dia.) (μm) | D10 (μm) | D90 (μm) | Number of pores (/mm$^2$) | Average opening diameter of pores (μm) | Equation[*Note 1] |
|---|---|---|---|---|---|---|---|---|---|
| Comparative Example 1 | 0.241 | 48 | 52.0 | 13.0 | 6.5 | 27.0 | 620 | 12.0 | 0.56 |
| Comparative Example 2 | 0.246 | 49 | 51.1 | 8.4 | 3.0 | 19.0 | 760 | 12.3 | 0.87 |
| Comparative Example 3 | 0.244 | 50 | 56.0 | 7.0 | 2.8 | 15.1 | 1570 | 7.8 | 0.87 |
| Comparative Example 4 | 0.241 | 50 | 51.6 | 8.3 | 3.3 | 17.1 | 1150 | 9.0 | 0.78 |

-continued

| | Partition wall thickness (mm) | Cell density (cells/cm$^2$) | Porosity (%) | D50 (Average pore dia.) (μm) | D10 (μm) | D90 (μm) | Number of pores (/mm$^2$) | Average opening diameter of pores (μm) | Equation$^{*Note\ 1}$ |
|---|---|---|---|---|---|---|---|---|---|
| Comparative Example 5 | 0.249 | 51 | 57.5 | 9.6 | 3.7 | 19.5 | 1060 | 10.3 | 0.73 |
| Comparative Example 6 | 0.239 | 51 | 53.4 | 5.8 | 1.8 | 9.8 | 1370 | 8.5 | 0.96 |
| Comparative Example 7 | 0.244 | 51 | 53.8 | 13.3 | 5.8 | 26.2 | 830 | 11.8 | 0.58 |
| Comparative Example 8 | 0.262 | 51 | 53.0 | 9.0 | 3.8 | 18.2 | 1040 | 9.6 | 0.71 |
| Example 1 | 0.241 | 51 | 53.1 | 9.1 | 3.8 | 18.4 | 1033 | 9.7 | 0.71 |
| Example 2 | 0.236 | 51 | 54.2 | 8.6 | 3.5 | 16.9 | 1253 | 9.3 | 0.73 |
| Example 3 | 0.244 | 50 | 53.3 | 9.0 | 4.4 | 17.3 | 1260 | 9.5 | 0.62 |
| Example 4 | 0.241 | 50 | 52.6 | 8.9 | 3.8 | 18.1 | 1000 | 9.4 | 0.71 |
| Example 5 | 0.239 | 51 | 53.5 | 7.0 | 2.8 | 12.5 | 1260 | 8.5 | 0.77 |
| Example 6 | 0.244 | 50 | 53.4 | 12.0 | 5.0 | 24.0 | 850 | 11.2 | 0.63 |
| Example 7 | 0.241 | 51 | 56.2 | 9.5 | 3.8 | 19.2 | 980 | 9.7 | 0.72 |
| Example 8 | 0.251 | 51 | 53.6 | 9.2 | 3.9 | 18.6 | 1000 | 9.3 | 0.70 |
| Example 9 | 0.241 | 50 | 52.2 | 9.0 | 3.6 | 17.0 | 1020 | 9.4 | 0.71 |
| Example 10 | 0.239 | 51 | 53.0 | 6.3 | 2.2 | 10.3 | 1290 | 8.1 | 0.84 |
| Example 11 | 0.236 | 51 | 54.0 | 8.5 | 3.3 | 16.3 | 1380 | 9.5 | 0.75 |
| Example 12 | 0.239 | 50 | 53.6 | 12.8 | 5.3 | 25.1 | 810 | 11.7 | 0.61 |
| Example 13 | 0.239 | 50 | 56.9 | 10.0 | 4.0 | 21.2 | 1030 | 10.2 | 0.72 |
| Example 14 | 0.257 | 51 | 53.9 | 8.9 | 3.8 | 17.3 | 1060 | 9.2 | 0.69 |

Remarks
*Note 1

Equation (1) represents (Log(D90)-Log(D10)/Log(D50).

Porosity

The porosity of the partition wall was measured using AUTOPORE 9500 (product name) manufactured by Micromeritics. In the measurement of the porosity, a part of the partition wall was cut out from the honeycomb filter to obtain a test piece, and the porosity was measured using the obtained test piece. The test piece was a rectangular parallelepiped having a length, a width, and a height of approximately 10 mm, approximately 10 mm, and approximately 20 mm, respectively. The sampling location of the test piece was set in the vicinity of the center of the honeycomb structure body in the axial direction.

Cumulative Pore Volume (D10, D50, D90, and Equation (1))

The cumulative pore volume of the partition wall was measured using AUTOPORE 9500 (product name) manufactured by Micromeritics. Also in the measurement of the cumulative pore volume, the test piece used for measuring the porosity was used.

On the honeycomb filter of Example 1, the pressure loss performance, the trapping performance, and the isostatic strength were evaluated in the following methods. The results are shown in Table 2.

Pressure Loss Performance Evaluation

Exhaust gas emitted from a 6.7 L diesel engine was allowed to flow into the honeycomb filters of each Example and Comparative Example, and the soot in exhaust gas was trapped at the partition wall of the honeycomb filter. Trapping of soot was performed until the deposition amount of the soot particles per unit volume (1L) of the honeycomb filter was 3 g/L. Then, exhaust gas at 200° C. was allowed to flow into the honeycomb filter at a flow rate of 12 Nm$^3$/min with the deposition amount of the soot particles being 3 g/L, and the pressures on the inflow end face side and the outflow end face side of the honeycomb filter were measured. Then, the pressure loss (kPa) of each of the honeycomb filters was determined by calculating the pressure difference between the inflow end face side and the outflow end face side. The honeycomb filters of each Example and Comparative Example were evaluated based on the following evaluation criteria. First, the value of the pressure loss of the honeycomb filter of Comparative Example 1 was denoted by $P_0$, the value of the pressure loss of each honeycomb filter was denoted by $P_x$, and the value of $(P_x-P_0)/P_0$ was calculated. The calculated value was defined as "pressure loss ratio (%)", and the case where the pressure loss ratio (%) is a negative value (less than 0%) was considered as passing, and the case where the pressure loss ratio (%) is 0% or more was considered as failing.

Trapping Performance Evaluation

Exhaust gas emitted from 6.7 L diesel engine was allowed to flow into the honeycomb filters of each Example and Comparative Example, and the soot in exhaust gas was trapped at the partition wall of the honeycomb filter. In the determination of the number of soot particles, assuming that the total number of soot particles emitted after WHTC (World Harmonized Transient Cycle) mode-running is the number of soot particles of the honeycomb filter to be determined, and the honeycomb filters of each Example and Comparative Example were evaluated based on the following evaluation criteria. First, the number of soot particles emitted from the honeycomb filter of Comparative Example 1 was denoted by $N_0$, the number of soot particles emitted from each honeycomb filter was denoted by $N_x$, and the value of $(N_x-N_0)/N_0$ was calculated. The calculated value was defined as "soot emission number ratio (%)", and the case where the soot emission number ratio (%) is a negative value (less than 0%) was considered as passing, and the case where the soot emission number ratio (%) is 0% or more was considered as failing.

Isostatic Strength Evaluation

The isostatic strengths (MPa) of the honeycomb filters of each Example and Comparative Example were measured according to a measuring method of isostatic breaking strength specified in JASO standard M505-87, which is an automobile standard issued by Society of Automotive Engineers of Japan, Inc. In the isostatic strength evaluation, the case where the isostatic strength is 2.3 MPa or more was considered as passing, and the case where the isostatic strength is less than 2.3 MPa was considered as failing.

TABLE 2

| | Pressure loss performance evaluation | Trapping performance evaluation | Isostatic strength evaluation (MPa) |
|---|---|---|---|
| Comparative Example 1 | 0% | 0% | 4.6 |
| Comparative Example 2 | 3% | −57% | 4.7 |
| Comparative Example 3 | −20% | −91% | 2.0 |
| Comparative Example 4 | 5% | −70% | 5.3 |
| Comparative Example 5 | −19% | −51% | 2.2 |
| Comparative Example 6 | 4% | −92% | 3.9 |
| Comparative Example 7 | −4% | 7% | 4.0 |
| Comparative Example 8 | 2% | −62% | 5.0 |
| Example 1 | −4% | −57% | 4.3 |
| Example 2 | −7% | −77% | 4.0 |
| Example 3 | −9% | −66% | 4.0 |
| Example 4 | −2% | −63% | 4.2 |
| Example 5 | −5% | −88% | 3.8 |
| Example 6 | −5% | −20% | 3.9 |
| Example 7 | −12% | −52% | 2.8 |
| Example 8 | −4% | −59% | 4.6 |
| Example 9 | −1% | −60% | 4.8 |
| Example 10 | −2% | −91% | 4.1 |
| Example 11 | −10% | −73% | 3.8 |
| Example 12 | −6% | −3% | 3.9 |
| Example 13 | −18% | −43% | 2.5 |
| Example 14 | −2% | −61% | 4.9 |

Examples 2 to 14

In Examples 2 to 14, the honeycomb filters having the partition wall thickness and the cell density as shown in Tables 1 were manufactured using raw material as shown below in the preparation of kneaded material for making the honeycomb formed bodies. The obtained honeycomb filters were measured for porosity of the partition wall in the same manner as in Example 1. The cumulative pore volume of the partition wall was also measured, and D10 ($\mu$m), D50 ($\mu$m), and D90 ($\mu$m) were determined from the pore diameter distribution based on the measurement result. Table 1 shows the results. In Examples 2 to 14, the average particle diameter of the water-absorbing polymer and the like, the blending ratio, and the water content to be added, in the raw material were changed.

Comparative Examples 1 to 8

In Comparative Examples 1 to 8, the honeycomb filters having the partition wall thickness and the cell density as shown in Tables 1 were manufactured using raw material as shown below in the preparation of kneaded material for making the honeycomb formed bodies. The obtained honeycomb filter was measured for porosity of the partition wall in the same manner as in Example 1. The cumulative pore volume of the partition wall was also measured, and D10 ($\mu$m), D50 ($\mu$m), and D90 ($\mu$m) were determined from the pore diameter distribution based on the measurement result. Table 1 shows the results. In Comparative Examples 1 to 8, the average particle diameter of the water-absorbing polymer and the like, the blending ratio, and the water content to be added, in the raw material were changed. In addition, in some comparative examples, a pore-forming resin was added to the pore former.

On the honeycomb filters of Examples 2 to 14 and Comparative Examples 1 to 8, the pressure loss performance, the trapping performance, and the isostatic strength were evaluated in the same manner as in Example 1. The results are shown in Table 2.

(Results)

It was confirmed that the honeycomb filters of Examples 1 to 14 exceeded each performance of the honeycomb filter of Comparative Example 1 which is a reference in all evaluations of the pressure loss performance, the trapping performance, and the isostatic strength. Therefore, the honeycomb filters of Examples 1 to 14 are excellent in the trapping performance, and can effectively suppress an increase in pressure loss as compared with a conventional honeycomb filter such as the honeycomb filter of Comparative Example 1.

On the other hand, the honeycomb filters of Comparative Examples 2 to 8 were below the performance of the honeycomb filter of Comparative Example 1 which is a reference in the evaluation of the pressure loss performance, the trapping performance, or the isostatic strength.

In the honeycomb filter of Comparative Example 2, the number of pores on the surface of the partition wall was as small as 760/mm$^2$, and the pressure loss performance was poor.

In the honeycomb filter of Comparative Example 3, the number of pores on the surface of the partition wall was as large as 1570/mm$^2$, and the isostatic strength was low.

In the honeycomb filter of Comparative Example 4, the porosity of the partition wall was as low as the 51.6%, and the pressure loss performance was poor.

In the honeycomb filter of Comparative Example 5, the porosity of the partition wall was as high as 57.5%, and the isostatic strength was low.

In the honeycomb filter of Comparative Example 6, the values of D10, D50 and D90 were lower than the predetermined numerical ranges, and the pressure loss performance was poor.

In the honeycomb filter of Comparative Example 7, the values of D10, D50 and D90 exceeded the predetermined numerical ranges, and the trapping performance was poor.

In the honeycomb filter of Comparative Example 8, the partition wall thickness was as thick as 0.262 mm, the values of D50 and D90 and the value of the average opening diameter of pores on the surface of the partition wall were outside the predetermined numerical ranges, and the pressure loss performance was poor.

INDUSTRIAL APPLICABILITY

The honeycomb filter according to the present invention can be used as a trapping filter for removing particulates and the like contained in exhaust gas.

DESCRIPTION OF REFERENCE NUMERALS

1: partition wall; 2: cell; 2a: inflow cell; 2b: outflow cell; 3: circumferential wall; 4: honeycomb structure body; 5: plugging portion; 11: first end face; 12: second end face; and 100: honeycomb filter.

What is claimed is:

1. A honeycomb filter comprising:

a pillar-shaped honeycomb structure body having a porous partition wall disposed to surround a plurality of cells which serve as fluid through channels extending from a first end face to a second end face; and a plugging portion provided at an open end on the first end face or the second end face of each of the plurality of cells, wherein a thickness of the partition wall is 0.236 mm or more and 0.257 mm or less, a porosity of the partition wall is 52.2 to 56.9%, an average pore diameter of the partition wall is 7 to 13 µm, a number per unit area of pores which exist at a surface of the partition wall and which have equivalent circle opening diameters exceeding 3 µm is 1000 to 1380/ mm², an average equivalent circle opening diameter of pores which exist at the surface of the partition wall and which have equivalent circle opening diameters exceeding 3 µm is 8.0 to 9.7 µm, and in a pore diameter distribution of the partition wall, in the case where a pore diameter (µm) whose cumulative pore volume is 10% of a total pore volume is denoted by D10, a pore diameter (µm) whose cumulative pore volume is 50% of the total pore volume is denoted by D50, and a pore diameter (µm) whose cumulative pore volume is 90% of the total pore volume is denoted by D90, D10 is 2.0 to 4.4 µm, D90 is 13.0 to 21.2 µm, and $(\mathrm{Log(D90)-Log(D10))/Log(D50)}$ is 0.84 or less.

2. The honeycomb filter according to claim 1, wherein the thickness of the partition wall is 0.236 mm or more and 0.252 mm or less, the porosity of the partition wall is 52.6 to 56.2%, the average pore diameter of the partition wall is 7 to 12 µm, the number per unit area of pores which exist at a surface of the partition wall and which have equivalent circle opening diameters exceeding 3 µm is 1000 to 1260/ mm², the average equivalent circle opening diameter of pores which exist at the surface of the partition wall and which have equivalent circle opening diameters exceeding 3 µm is 8.8 to 9.7 µm, D10 is 2.8 to 4.4 µm, D90 is 16.5 to 21.2 µm, and $(\mathrm{Log(D90)-Log(D10))/Log(D50)}$ is 0.77 or less.

3. The honeycomb filter according to claim 1, wherein a cell density of the honeycomb structure body is 43 to 56 cells/cm².

4. The honeycomb filter according to claim 1, wherein the partition wall is made of a material including cordierite as a main component.

* * * * *